United States Patent [19]
Durand et al.

[11] 3,874,247
[45] Apr. 1, 1975

[54] WORM REDUCING GEAR

[76] Inventors: Francois Durand, 108 Bld. Carnot, 78 Le Vesinet; Lucien Vezole, 51, Bld. de Bellevue, 91 Draveil, both of France

[22] Filed: Oct. 17, 1973

[21] Appl. No.: 407,217

[52] U.S. Cl. .............................................. 74/425.5
[51] Int. Cl. .............................................. F16h 1/16
[58] Field of Search .......................... 74/425.5, 425

[56] References Cited
UNITED STATES PATENTS
1,175,251  3/1916  Fleury et al ...................... 74/425.5

*Primary Examiner*—Leonard H. Gerin
*Attorney, Agent, or Firm*—Michael S. Striker

[57] ABSTRACT

This worm reducing-gear of relatively reduced dimensions has associated therewith in a same and single gear case two gear trains, namely a primary reducing-gear driven from the input shaft or motor, and an intermediate reducing-gear disposed between said primary gear train and the worm of said worm reducing-gear; the gear case comprises two halves and all the bearing-receiving cavities thereof, except those of the crown-wheel shaft, are formed in the joint plane along which said case halves are assembled. Clutch means may be provided between said primary and intermediate reducing-gears and the worm-gear proper for changing the worm speed or braking the mechanism.

6 Claims, 5 Drawing Figures

WORM REDUCING GEAR

This invention relates to reducing-gears of the worm and tangent gear type.

Reducing-gears of this type are adapted to transmit torques continuously, and the lower the worm speed, the higher the value of the torque that can be transmitted therethrough. On the other hand the lower the torque ratio between the gear wheel and the worm, the higher the efficiency of the reducing-gear. Consequently, when a worm reducing-gear is driven from a relatively fast motor it is advantageous to provide a primary spur-gear reducing train of gear between the motor and the worm of the worm reducing-gear in order to improve both the transmissible power and the efficiency of the mechanism.

However, the addition of a primary reducing-gear comprising a first primary train of spur gears and a second intermediate train of spur gears is objectionable in that it is attended by a substantial increment in the over-all dimensions of the assembly and also by a greater complexity of this assembly due notably to the various necessary journal bearings.

The same inconvenience is observed when a worm reducing-gear is associated with two upstream trains of gears and provided with clutch means for changing at will the rotational velocity of the worm in this reducing-gear. In fact, in this case the difficulties are substantially the same.

It is therefore the essential object of this invention to provide a worm reducing-gear comprising two upstream intermediate trains of gears but so arranged that the various rotary members are assembled in a common gear case, the over-all dimensions of the assembly being only very slightly increased in comparison with a conventional reducing-gear. The reducing-gear according to this invention is also so designed that the general arrangment of the assembly is relatively simple notwithstanding the presence of additional trains of gears.

The improved worm reducing-gear according to this invention is characterised in that its gear case is made of two halves having a joint plane coincident with the worm axis and perpendicular to the axis of the crown wheel, said case halves forming a partition dividing the inner space of the case into a first compartment containing the worm and its crown wheel and another compartment containing the two primary and intermediate trains of gears, said partition and the side walls of the case halves comprising five bearing cavities intersected by the joint plane, three bearing cavities being disposed in line and containing the two bearings of the worm and one of the bearings of the pinion of said primary train, the other two cavities, disposed in line with each other, having an axis parallel to the worm axis and containing the bearings of the gear of said primary train and of the pinion of said intermediate train.

According to cases, the two trains of gears provided upstream of the worm may constitute either a primary reducing-gear for reducing the rotational speed of this worm or intermediate gears permitting speed changes. In this last case the reducing-gear comprises clutch means for coupling or uncoupling:

the pinion of the primary gear train with respect to the worm shaft, the driven gear of the primary train with respect to the pinion of the intermediate train, respectively.

Two typical embodiments of the worm reducing-gear according to this invention will now be described in detail with reference to the attached drawings given by way of example, In the drawings.

Figure 1:
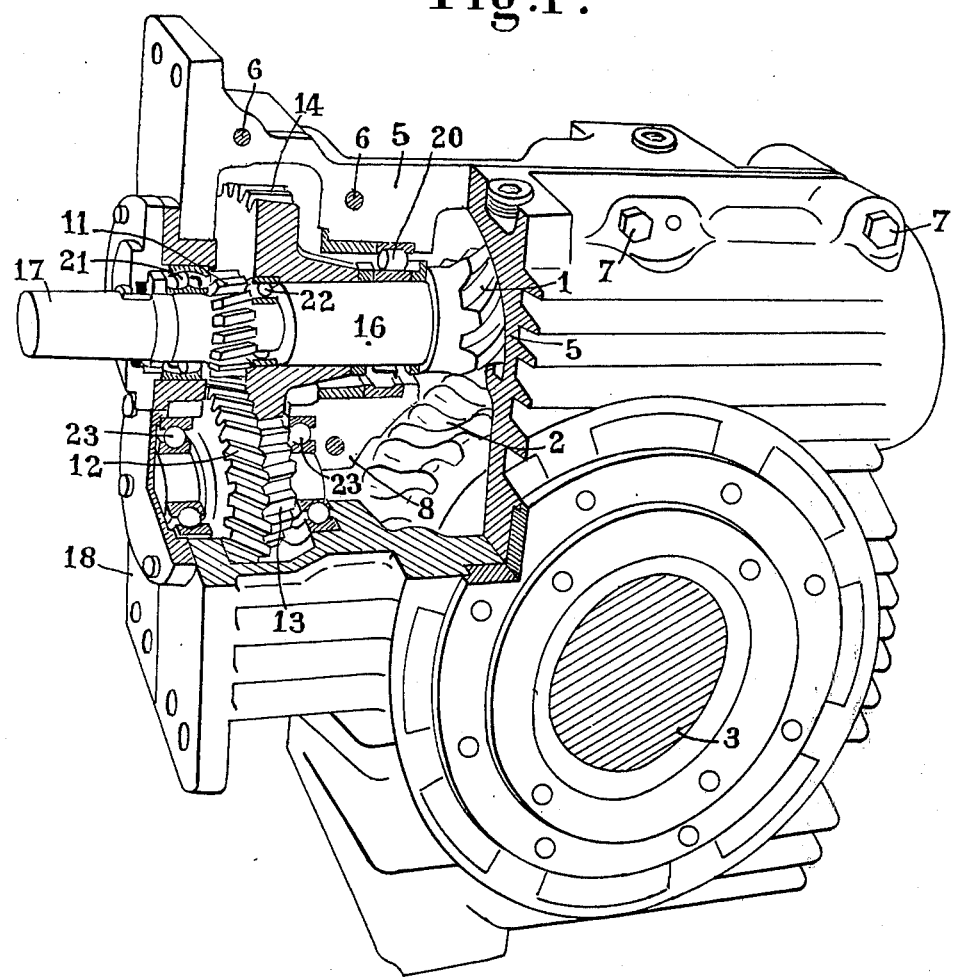
FIG. 1 is a perspective view with parts broken away showing a worm reducing-gear comprising two trains of additional gears acting as a primary reducing-gear.
Figure 2:
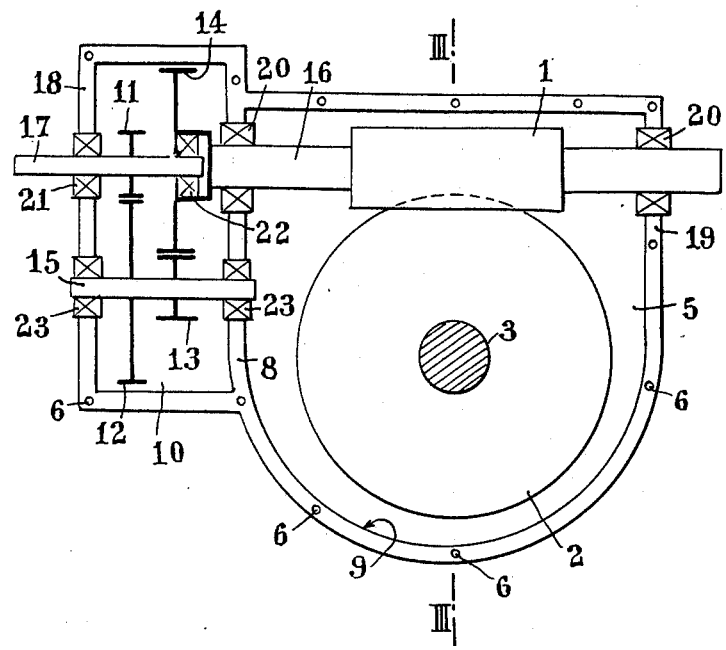
FIG. 2 is a diagrammatic section taken in a plane perpendicular to the axis of the tangent or crown wheel, this plane containing the worm axis.
Figure 3:
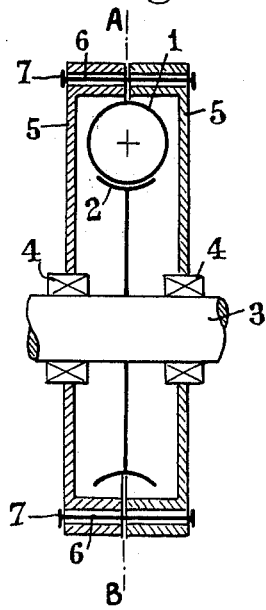
FIG. 3 is a section taken along the line III—III of FIG. 2.

The reducing-gear illustrated in FIGS. 1–3 of the drawings comprises a worm 1 in constant meshing engagement with a tangent crown wheel 2. The shaft 3 of this crown wheel 2 is journalled in a pair of bearings 4 carried by the case of the reducing-gear.

According to an essential feature characterising this invention, this gear case consists of two halves 5, 5 assembled in a joint plane A—B containing the axis of worm 1 and perpendicular to the axis of said crown wheel 2.

Along their mutually engaging marginal portions the case halves 5 comprise holes 6 adapted to receive assembling bolts 7.

Each case half 5 has formed in its bottom an aperture in which one of the bearings 4 of shaft 3 of said crown wheel 2 is fitted. Furthermore, these two half-cases are formed with an integral inner partition element and the two partition elements of the case halves 5 constitute in the assembled condition of these halves 5 a partition 8 dividing the inner space of the case into two compartments, that is, a first compartment 9 containing the worm 1 and the tangent crown wheel 2, and a second compartment 10 containing the additional gear trains provided upstream of the worm 1. Two such gear trains are provided, namely a primary gear train comprising a pinion 11 and a driven gear 12, and an intermediate gear train comprising a pinion 13 and a driven gear 14. The gear 12 of the first train and pinion 13 of the second train are rigid with a common shaft 15. Moreover, the driven gear 14 of the intermediate gear train is secured to the stub shaft 16 projecting from the corresponding end of worm 1. Finally, the shaft 17 of pinion 11 of said primary gear train extends coaxially to the shaft 16 so as to be co-extensive therewith.

The intermediate partition 8 and end walls 18, 19 of the case halves 5 comprise five apertures for receiving as many bearings. Actually, each aperture consists of a pair of complementary semicircular notches formed in the registering edges of the end walls or intermediate partitions of said case halves 5. Therefore, the cavities for the corresponding bearings are split or divided along the joint plane A—B.

With this arrangement, three bearing cavities are axially aligned with one another and with the worm shaft 16. Besides, two bearing cavities out of the last-mentioned three receive the bearings 20 for mounting the worm shaft. As to the third cavity 21, it receives the bearing for mounting the input shaft 17 rigid with the pinion 11 of the primary gear train. The other bearing 22 for mounting the same shaft 17 is fitted in the hub of gear 14 rigidly supported in turn by said worm shaft 16.

The other two bearing cavities contemplated in this arrangement are disposed in line and their common axis is parallel to that of the worm 1; these two cavities contain a pair of bearings 23 for mounting the shaft 15 of the gear 12 and pinion 12. Under these conditions, the distance between the axis of these two last-named bearing cavities and the axis of the three first bearing cavities corresponds to the distance between centers of the two trains of gears of the primary reducing-gear.

With this arrangement, the two reducing units contemplated, namely the worm reducing-gear 1, 2 and the reducing-gear 11–14 are assembled in a same and single gear case of relatively reduced over-all dimensions. However, due to the presence of the primary reducing-gear, the worm 1 rotates at a considerably reduced speed in relation to the speed of the motor shaft, so that high torques can be transmitted with a maximum efficiency.

Figure 4:
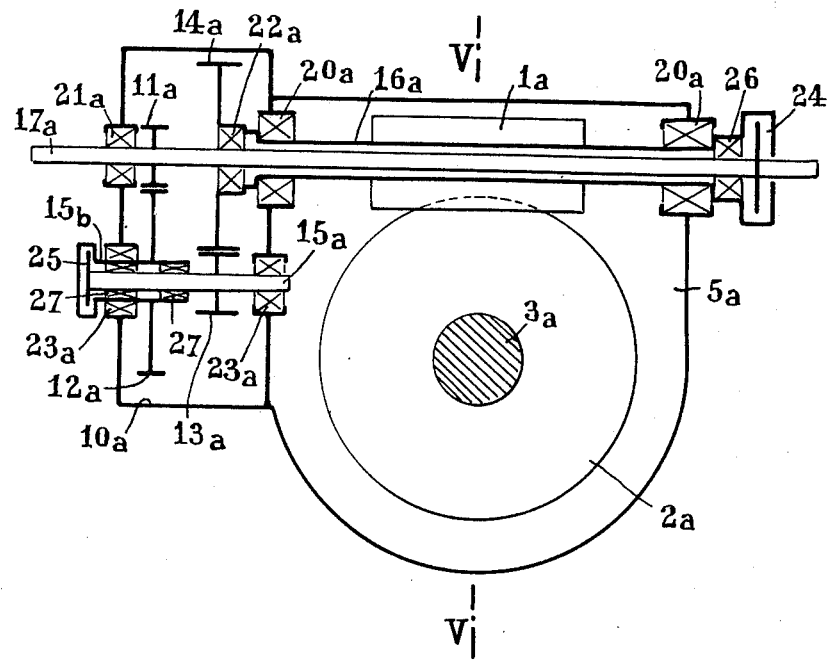
FIG. 4 is a view similar to FIG. 2, showing a reducing-gear according to the present invention, wherein the two additional gear trains provided upstream of the worm are associated with clutch means to permit speed changes; and FIG.. 5 is a section taken along the line V—V of FIG. 4.
Figure 5:
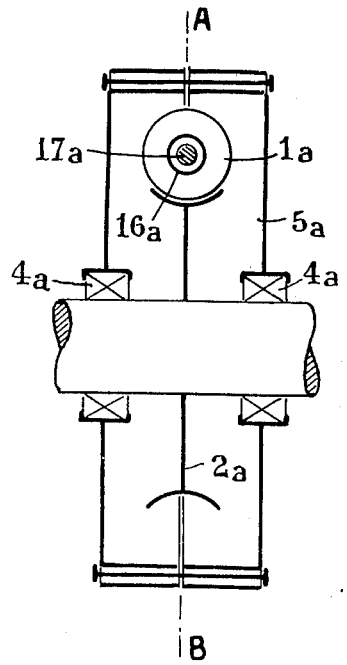

FIGS. 4 and 5 illustrate a reducing-gear according to this invention wherein the two additional trains of gears contemplated upstream of the worm are associated with clutch means for constituting a change-speed reducing-gear.

However, in this embodiment the gear case comprises as in the preceding example two halves 5a, 5a assembled along the same joint plane A—B and formed with five identical cavities for receiving the various bearings. Besides, the component elements of this modified embodiment which are identical with, or similar to, certain elements of the first embodiment, are designated by the same reference numerals completed by the letter a.

This reducing-gear differs from the preceding one in that it comprises a pair of clutch mechanism 24 and 25 mounted externally of the gear case.

The first clutch mechanism 24 is adapted to couple or uncouple the pinion 11a of the primary gear train with respect to the sahft 16a of worm 1a. To this end, the shaft 16a is hollow and the shaft 17a of pinion 11a extends through the shaft 16a from end to end and projects from this shaft, the clutch mechanism 24 being disposed externally of the case on the side opposite to the compartment 10a containing the additional two trains of gears.

In compartment 10a, the shaft 17a is mounted in a pair of bearings 21a and 22a of same size as bearings 21 and 22 contemplated in the preceding embodiment. Its opposite end is mounted in an additional bearing 26 carried by the corresponding end of said hollow shaft 16a.

The other clutch mechanism 25 is intended for coupling and uncoupling the driven gear 12a of the primary gear train with respect to the pinion 13a of the intermediate gear train.

In this modified embodiment the pinion 13a and gear 12a are secured to two separate shafts 15a and 15b. Shaft 15b is hollow and shaft 15a extends through it from end to end, and the clutch mechanism 25 disposed externally of the gear case is associated with the end of each one of these two shafts which is opposite to the crown wheel 2a.

The hollow shaft 15b has fitted therein a pair of additional bearings 27 for mounting the inner shaft 15a of which the opposite end is mounted in a bearing 23a. Shaft 15b is mounted in turn in the other bearing 23a. As will readily occur to those skilled in the art, controlling one and/or the other clutch mechanism will provide the desired speed values of the crown wheel shaft 3a.

Thus, when clutches 24 and 25 are released, the motor rotates freely in relation to the worm reducing-gear.

When the clutch mechanism 24 is disconnected between worm 1a and pinion 11a, and clutch mechanism 25 is engaged, the worm 1a is driven at low speed. In fact, in this case the two additional gear trains are operative and provide a maximum reduction ratio for driving the worm 1a.

On the other hand, if clutch 25 is released and clutch 24 is engaged, the worm 1a is driven at the same speed as the output shaft of the driving motor, that is at high speed.

Finally, if both clutches 24 and 25 are in their engaged position, the motor shaft is braked.

Therefore, by properly controlling the pair of clutch mechanisms 24 and 25 it is possible to obtain at the same time a braking position and a clutch-release position, and also a low-speed driving position and a high-speed driving position.

According to the specific applications contemplated, the two clutch mechanisms may be either of the type engaged in the inoperative position or, in contrast thereto, of the type disengaged in the inoperative position. Thus, for instance, when it is desired to control a lifting or hoisting movement, clutches of the type engaged in the inoperative position are to be used, preferably. In fact, in case of failure in the mains supplying current to the driving motor, the reducing-gear is braked automatically.

These clutch mechanisms may be controlled by mechanical or electrical means, but pneumatic or hydraulic clutches may also be used to advantage.

As in the first embodiment illustrated in FIGS. 1–3 the arrangement illustrated in FIGS. 4 and 5 permits of associating in a same gear case of relatively reduced over-all dimensions the worm reducing-gear 1, 2 and the two additional gear trains providing the change-speed characteristic as described hereinabove.

However, another advantageous feature lies in the fact that the two clutch mechanisms 24, 25 are disposed externally of the gear case 5a, 5a. Under these conditions, the necessary repair and maintenance operations can be carried out very easily, as well as, the replacement of clutch components or the complete clutch mechanisms in case of wear. In fact, clutches are liable to undergo an appreciable wear much more rapidly than the gears enclosed in the case.

With the arrangement contemplated, a two-speed worm reducing-gear can be constructed wherein a relatively great discrepancy, of the order of 1 to 10, may be obtained between the gear ratios. Of course, any other ratio values may be contemplated according to cases and applications.

What we claim is:

1. A gear transmission comprising a case; a first shaft extending between the exterior and the interior of said case; a second shaft in said case and extending parallel to said first shaft; a worm gear coaxial with said first shaft; a third shaft extending between the interior and the exterior of said case and spaced from axis of said worm gear; a crown wheel rigidly connected to said third shaft and meshing with said worm gear; a primary gear train including a first gear wheel rigidly connected to said first shaft, and a second gear wheel connected to said second shaft and meshing with said first gear wheel; an intermediate gear train including a third gear wheel connected to said second shaft, and a fourth gear wheel rigid with said worm gear and meshing with said third gear wheel; and bearing means for mounting said shafts and said worm gear in said case for rotation, said bearing means including a bearing accommodated internally of said fourth gear wheel and mounting said first shaft therein for differential rotation with respect to said fourth gear wheel.

2. A gear transmission as defined in claim 1 wherein said case includes two case halves assembled along a joint plane containing said axis of said worm gear and perpendicular to the axis of said third shaft, said two case halves having side walls and a partition subdividing the interior of said case into a first compartment accommodating said worm gear and said crown wheel and a second compartment accommodating said primary and intermediate gear trains and the associated shafts and said two case halves being formed with bearing cavities for accommodating said bearing means and provided in said partition and in said side walls and intersected by said joint plane.

3. A gear transmission comprising a case; a first shaft extending between the exterior and the interior of said case; a second shaft in said case and extending parallel to said first shaft; a worm gear coaxial with said first shaft; a third shaft extending between the interior and the exterior of said case and spaced from the axis of said worm gear; a crown wheel rigidly connected to said third shaft and meshing with said worm gear; a primary gear train including a first gear wheel rigidly connected to said first shaft, and a second gear wheel supported on said second shaft and meshing with said first gear wheel; an intermediate gear train including a third gear wheel connected to said second shaft, and a fourth gear wheel rigid with said worm gear and meshing with said third gear wheel; bearing means for mounting said shafts and said worm gear in said case for rotation; and means including two clutch mechanisms for selectively coupling said first shaft to said worm gear and said second gear to said second shaft.

4. A gear transmission according to claim 3, in which the clutch mechanisms are mounted externally of the case.

5. A gear transmission according to claim 4, in which said worm is hollow and surrounds concentrically the first shaft, the clutch mechanism interposed between these two shafts being disposed externally of the case, on the side opposite to the compartment containing the two primary and intermediate gear trains.

6. A gear transmission according to claim 3, in which said second gear wheel is hollow and has mounted therein said second shaft, the clutch mechanism interposed between said second gear wheel and said second shaft being disposed externally of the case on the side of the compartment containing the primary and intermediate gear trains.

* * * * *